(12) United States Patent
Romary (10) Patent No.: US 7,475,809 B2
(45) Date of Patent: Jan. 13, 2009

(54) MOBILE BANKING VEHICLE

(75) Inventor: Edward J. Romary, Fort Wayne, IN (US)

(73) Assignee: Romary Associates, Inc., Fort Wayne, IN (US)

( * ) Notice: Subject to any disclaimer, the term of this patent is extended or adjusted under 35 U.S.C. 154(b) by 261 days.

(21) Appl. No.: 11/352,040

(22) Filed: Feb. 10, 2006

(65) Prior Publication Data

US 2007/0187483 A1 Aug. 16, 2007

(51) Int. Cl.
*G07D 11/001* (2006.01)
(52) U.S. Cl. ........................... 235/379; 235/381
(58) Field of Classification Search ............... 235/379, 235/380, 381, 375; 109/19
See application file for complete search history.

(56) References Cited

U.S. PATENT DOCUMENTS

| | | | |
|---|---|---|---|
| 4,417,527 A | 11/1983 | Williams et al. | |
| 4,557,352 A | 12/1985 | Tschappat, Jr. | |
| 4,861,049 A | 8/1989 | Losi | |
| 5,726,430 A * | 3/1998 | Ruggirello | 235/379 |
| 6,422,158 B1 | 7/2002 | Fitts, Sr. et al. | |
| 6,655,302 B1 * | 12/2003 | Ross | 109/2 |
| 2002/0011393 A1 * | 1/2002 | Siemens | 194/215 |
| 2002/0184150 A1 * | 12/2002 | Wong et al. | 705/42 |

OTHER PUBLICATIONS

Talking Banking Services to the People; Equity's Mobile Banking Unit; Nov. 2003; by Coetzee et al.; see pp. 2-5 (20 total pages).

Mobile Banking Facilities internet web page www. rentsys.com/recovery/mbc.asp; by Rentsys Recovery Services; date unavailable (2 total pages).

* cited by examiner

*Primary Examiner*—Thien M Le
(74) *Attorney, Agent, or Firm*—George Pappas (57) ABSTRACT

A mobile banking vehicle including wheels supporting a chassis, an engine and an office area at a floor height supported by the vehicle chassis. An exterior door provides access to the office area. A drive-up teller area is provided, preferably at the rear of the vehicle, and having a floor height which is lower than the office area floor height and, hence, closer to the ground surface. Steps are provided between the teller area lower and the office area higher floor surfaces. A teller window and transaction drawer are provided through the vehicle rear wall and adjacent the lowered floor at a height comfortable for use in both drive-up and walk-up customer banking transactions and which is comfortable for use by the bank teller. A drive-up lane is provided at the ground surface outside of the vehicle teller window and transaction drawer for allowing customers to drive their vehicle thereupon and next to the teller window and drawer. A bumper extends from the rear wall below the teller window and transaction drawer for helping banking customers locate their vehicle on the drive-up lane and at a proper distance from the banking vehicle. An intercommunication system is also provided whereby verbal communication is selectively provided between the bank teller and the banking customer at the teller window. A selectively extendible canopy is also provided on the rear wall over the teller window and the drive-up lane for protecting the transaction drawer and window from the weather during use.

35 Claims, 9 Drawing Sheets

MOBILE BANKING VEHICLE

BACKGROUND OF THE INVENTION

1. Field of the Invention

The present invention related to mobile bank vehicles and, more particularly, relates to a self powered self contained mobile bank vehicle functioning in substantially all respects similar to a regular fixed banking building and including, among other capabilities, drive up lane and teller window, lobby, automated teller machine (ATM), and security features.

2. Description of Related Art

Banks and fixed bank buildings or structures have been in use for centuries. For decades, fixed bank structures have been equipped with drive-up teller windows and transaction drawers whereby customers can drive their vehicle in close proximity thereto, speak to a teller who is visible through the window and conduct their banking business by passing or moving their financial documents through the transaction drawer. The teller window is typically equipped with bullet resistant glass. The transaction drawer can be a more simple opening below the lowermost edge of the window glass wherethrough financial documents can be passed, or a more secure sliding drawer having a drawer door which is coupled to and adapted to open and close with the drawer for providing access to the drawer by only one of the teller or customer at any time. An intercommunication system is typically also provided for verbal communication between the teller and banking customer.

More recently, mobile banking vehicles have been devised for selectively bringing the bank to the customer. Large tractor trailers have been modified to include an office area accessible by steps and a door and wherein the office area includes a lobby and teller area adjacent one another, an administration area, a conference room and a private office. Small trucks have also been equipped as mobile banking vehicles by providing a teller window on a side wall thereof, whereby customers can walk up to the vehicle and conduct their banking business therethrough. Similarly, trailers and engine driven vehicles not having an office area therewithin have been equipped with ATM's on their side wall, whereby banking customers can walk up and use the ATM.

Of the existing mobile banking vehicles which are equipped with office areas for banking personnel and/or customers, steps are required between the ground surface and the higher floor of the office area. This is because the floor of the office area must be supported by and set on the chassis of the vehicle, and the chassis is supported by the vehicle wheels, axles and suspension system. The office area floor height also dictates the location of any windows relative to the ground surface and, placement of windows at a proper usable height relative to the office area floor places the window at an unusable or improper height for those on the ground surface outside of the office area. Currently, therefore, banking vehicles equipped with teller windows place such windows at a compromised height which is relatively low with respect to the office area floor height and relatively high with respect to the ground surface, but which thereby places such window at a height allowing customer walk-up transactions therethrough. Unfortunately, bank personnel are uncomfortable when working through such teller window because they must sit and work generally downwardly. Such compromised teller window locations are also relatively high with respect to the ground surface and are, hence, limited to substantially only customer walk-up transactions.

SUMMARY OF THE INVENTION

Having first recognized the limitations and shortcomings of prior mobile banking vehicles, a need has been perceived and, hence, the object of the present invention is to overcome such limitations and shortcomings of prior banking vehicles and, more particularly, for a mobile banking vehicle which is provided with a teller window at a comfortable and proper height for use by both the banking personnel inside the banking vehicle and the customer outside of the banking vehicle.

Another object of the present invention is to provide a transaction drawer adjacent the teller window which is also at comfortable and proper height for use by both the banking personnel inside the banking vehicle and the customer outside of the banking vehicle. Yet another object of the present invention is to provide the teller window and transaction drawer at a comfortable and proper height for use by the banking personnel and which may comfortably be used by customers for both walk-up and drive-up banking transactions.

Yet another object of the present invention is to provide a mobile bank vehicle which can function substantially similar in all respects to a regular fixed banking building and including, among other capabilities, a drive-up lane and teller window and transaction drawer for use by walk-up and/or drive-up customers, lobby, automated teller machine (ATM), and security features.

These and other objects of the present invention are achieved by providing a mobile banking vehicle having an enclosed office area defined by a floor, exterior walls and roof. The enclosed office area is accessible by bank personnel and customers via a door through the exterior wall. The office area is supported on a truck chassis placing the office area floor higher than the ground surface. Selectively retractable steps are provided adjacent the door between the ground surface and the higher office area floor height. The chassis is preferably supported at its front end with front wheels adapted for steering the vehicle, and rear wheels at the rear end thereof. The banking vehicle is preferably provided with an engine for selective engaging and driving the wheels and transport of the vehicle.

The office area floor is provided with a lowered area which is at a height lower than the other floor height and which is substantially closer to the ground surface. Steps are provided between the higher and lower floor areas for use by banking personnel. A teller window is located through an exterior wall adjacent the lowered floor area at a height which is comfortable and proper for use in both drive-up and walk-up customer banking transactions, and which is comfortable for use by banking personnel within the office area enclosure. Preferably the teller window is provided with bullet resistant glass and includes a bottom edge located about 35-57 inches, and most preferably about 37-41 inches, from a ground surface.

A transaction drawer is also provided through the exterior wall adjacent the lowered floor area and adjacent or, more preferably, below the teller window, whereby financial documents may be selectively moved between the inside and the outside of the enclosure. Preferably, the transaction drawer includes a bottom drawer surface located about 25-52, and most preferably about 25-29, inches from a ground surface. The transaction drawer can be an opening below the lowermost edge of the teller window glass wherethrough financial documents can be passed, or a sliding drawer having a drawer door which is coupled to and adapted to open and close with the drawer for providing access to the drawer by only one of the bank teller or customer at any time.

Preferably, an intercommunication system is provided whereby verbal communication is selectively provided between the bank teller inside the enclosure and the customer outside of the enclosure adjacent the teller window. The intercommunication system may include a plurality of slot openings through the teller window glass for providing verbal communication between the inside and the outside of the enclosure, or can be electronic including electronic microphones and speakers.

The mobile banking vehicle further preferably includes a customer vehicle drive up lane or area outside of the enclosure and adjacent the teller window. For drive-up banking transactions, to prevent the drive-up banking customer's vehicle from hitting the banking vehicle and helping such customer locate his vehicle at a proper distance from the banking vehicle, a bumper is provided on the banking vehicle exterior wall substantially below the teller window. The bumper can be fixed to and extending at least eight inches away from the exterior wall, or can be selectively extendable and retractable, whereby it can be extended when the teller window is being used and retracted when the teller window is not in use, such as when the banking vehicle is being transported to another location.

The mobile banking vehicle further preferably includes a canopy selectively extendable from the exterior wall adjacent the lowered floor area and substantially over the teller window and transaction drawer.

In one form thereof, the present invention is directed to a mobile banking vehicle including an enclosure having a floor, walls and roof, a door in a wall providing selective access to within the enclosure, and wheels supporting and for transport of the enclosure. The banking vehicle is provided with a first area having a first floor height, a second area having a second floor height lower than the first floor height, and a teller window through a wall of the enclosure adjacent the second area.

In another form thereof, the present invention is directed to a mobile banking vehicle including an enclosure having a floor, walls and roof, a door in a wall providing selective access to within the enclosure, and wheels supporting and for transport of the enclosure. The mobile banking vehicle further includes a transaction drawer extending through a wall, whereby financial documents may be selectively moved between the inside and the outside of the enclosure.

In yet another form thereof, the present invention is directed to a mobile banking vehicle including a vehicle chassis having a front terminal end and rear terminal end. Front wheels support the chassis adjacent the front terminal end at a vertical height and are adapted for steering the banking vehicle. Rear wheels support the chassis adjacent the rear terminal end at the vertical height. An engine is provided for selectively engaging and driving one of the front or rear wheels. A rear portion of the chassis between the rear wheels and the rear terminal end is located lower than the chassis vertical height. A wall is provided adjacent the lower rear portion, and a teller window is provided through the wall.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein.

Corresponding reference characters indicate corresponding parts throughout the several views of the drawings.

The exemplifications set out herein illustrate preferred embodiments of the invention in one form thereof and such exemplifications are not to be construed as limiting the scope of the disclosure or the scope of the invention in any manner.

DETAILED DESCRIPTION OF THE PREFERRED EMBODIMENT

A mobile banking vehicle constructed in accordance with the principles of the present invention is shown and depicted in the drawings by the numeral 10. Mobile banking vehicle 10 includes front wheels 12 near the front end 14 of vehicle 10 and rear wheels 16 near the rear end 18 of vehicle 10. Front wheels 12 are adapted for steering the vehicle 10 in a known and customary manner. An engine (not shown) is provided at the front end 14 under the engine compartment 20 and is selectively engaged to the rear wheels 16 with a transmission system (not shown) in a known and customary manner for driving the wheels 16 and transport of the mobile vehicle 10.

Figure 1:
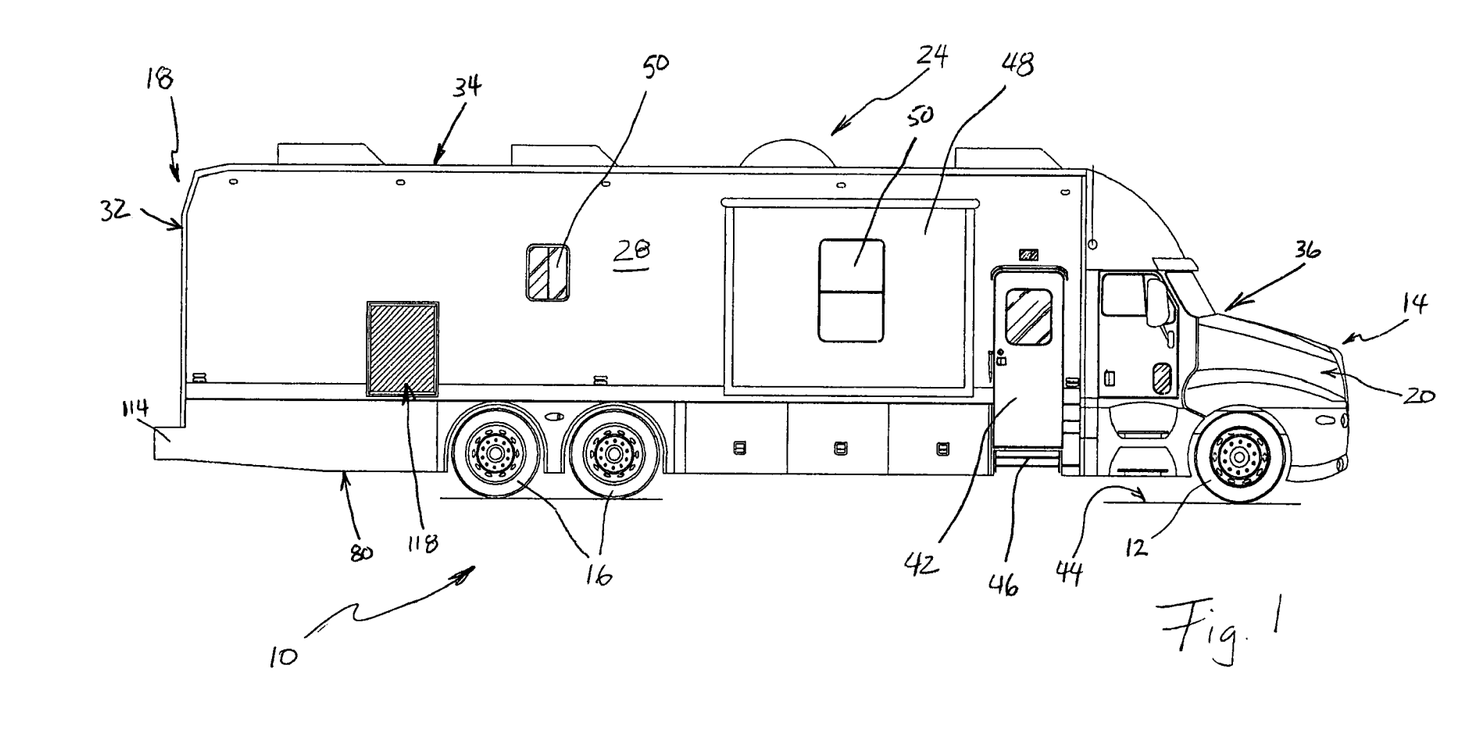
FIG. 1 is a side elevation view of a mobile banking vehicle constructed in accordance to the principles of the present invention.
Figure 2:
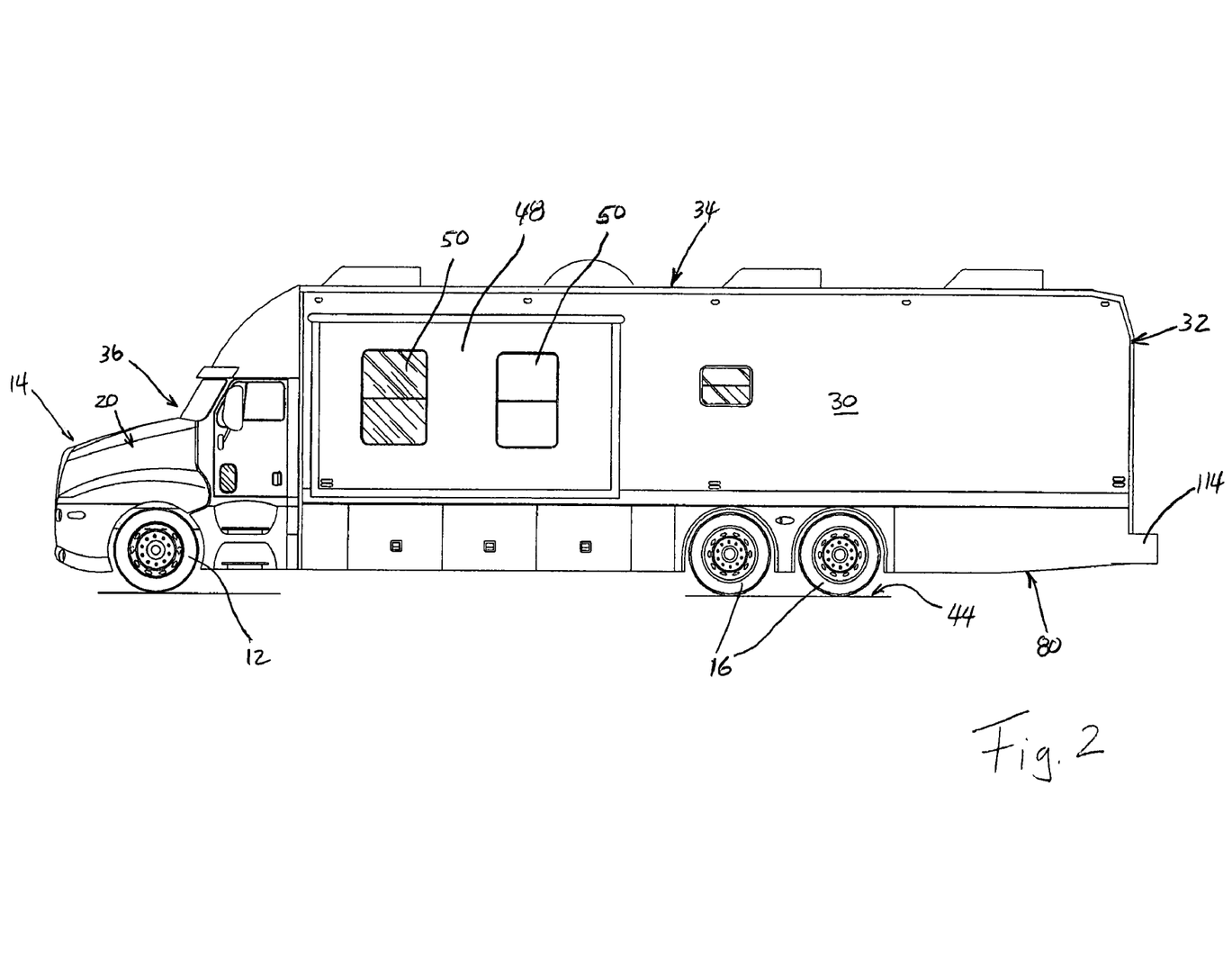
FIG. 2 is an elevation view of the opposite side of the mobile banking vehicle shown in FIG. 1.
Figure 3:
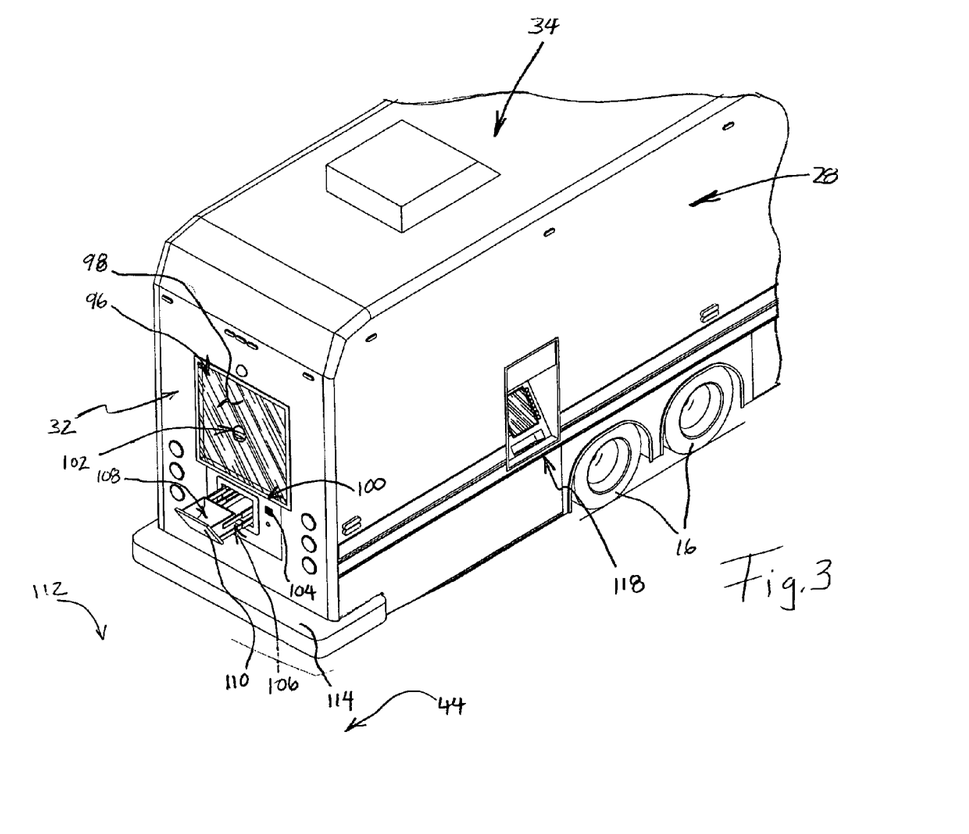
FIG. 3 is perspective view of the rear, side and roof of the mobile banking vehicle shown in FIG. 1.
Figure 4:
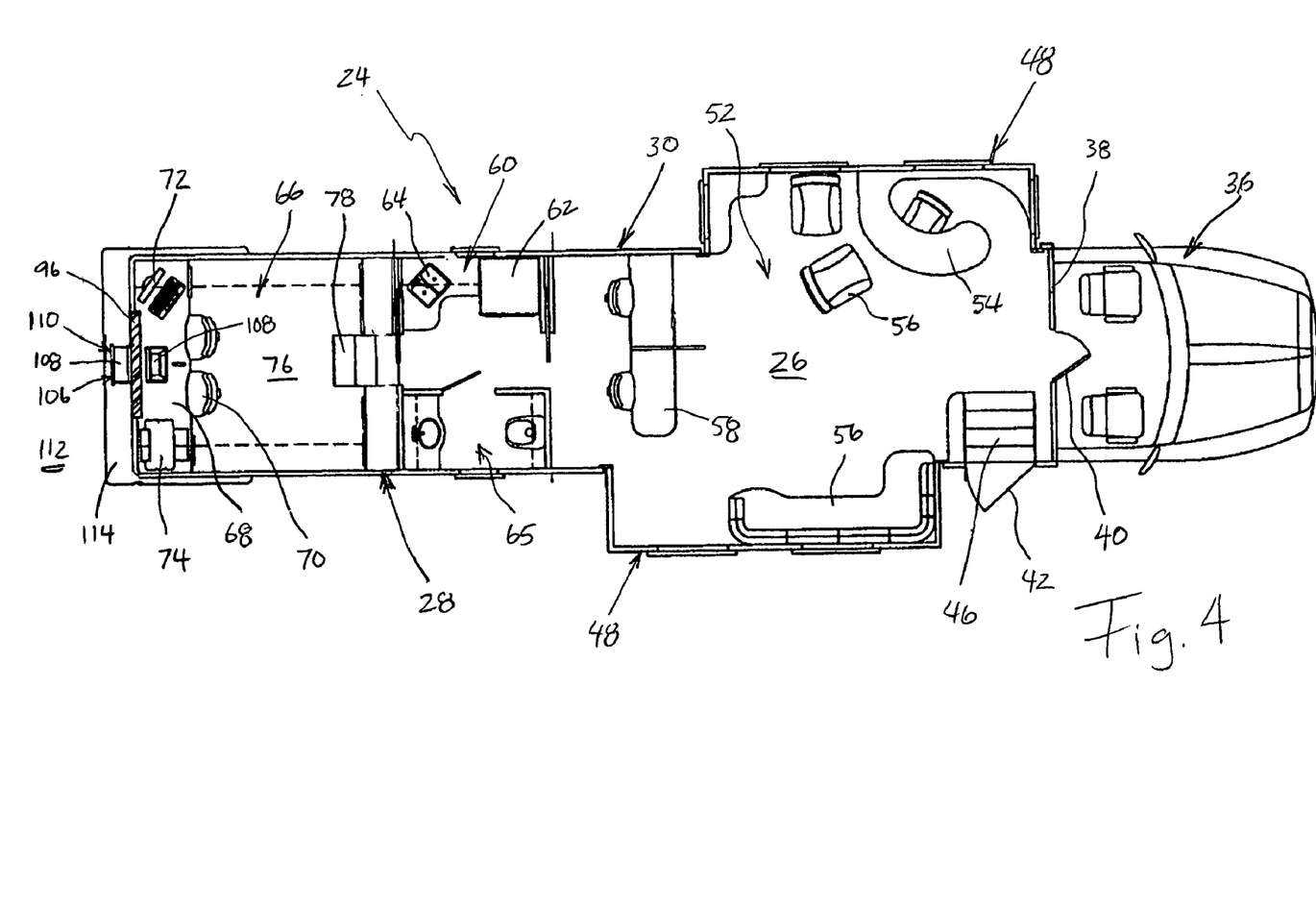
FIG. 4 is a plan view of the mobile banking vehicle shown in FIG. 1 with the roof removed and showing the interior layout.
Figure 5:
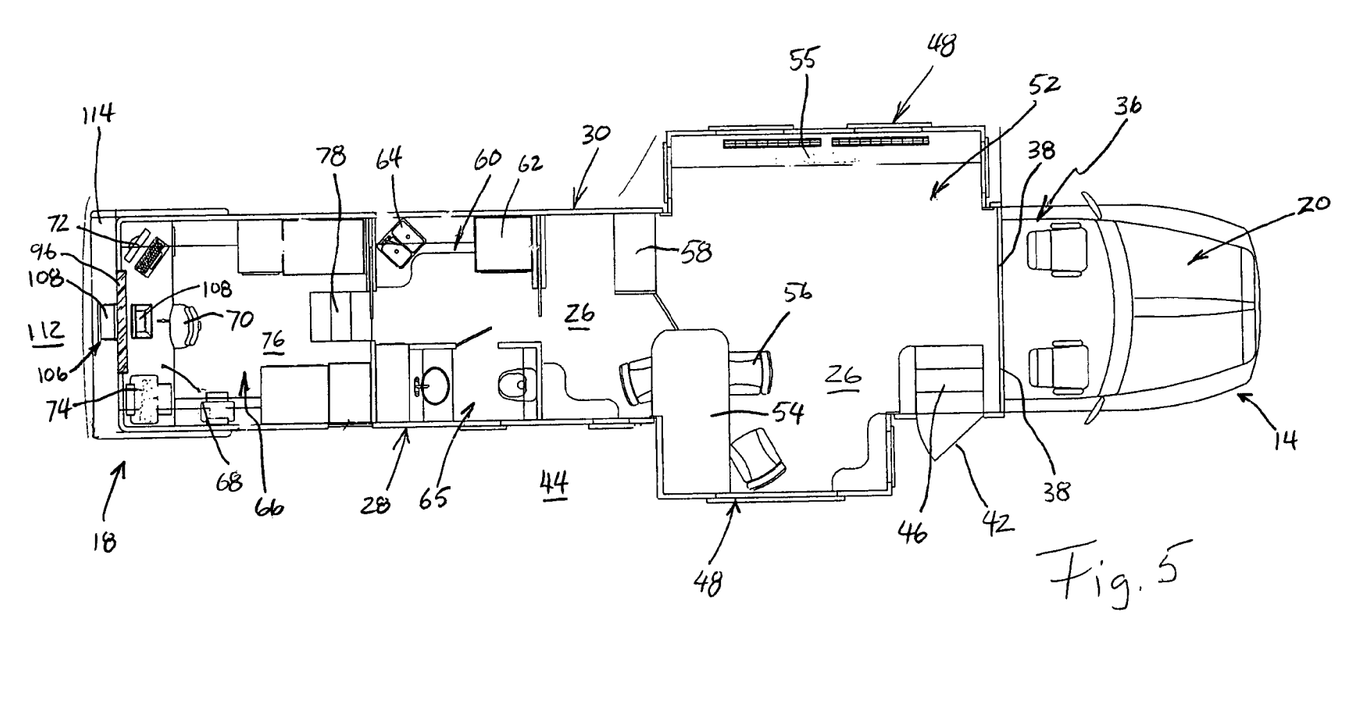
FIG. 5 is a plan view similar to FIG. 4, but depicting a different interior layout.
Figure 6:
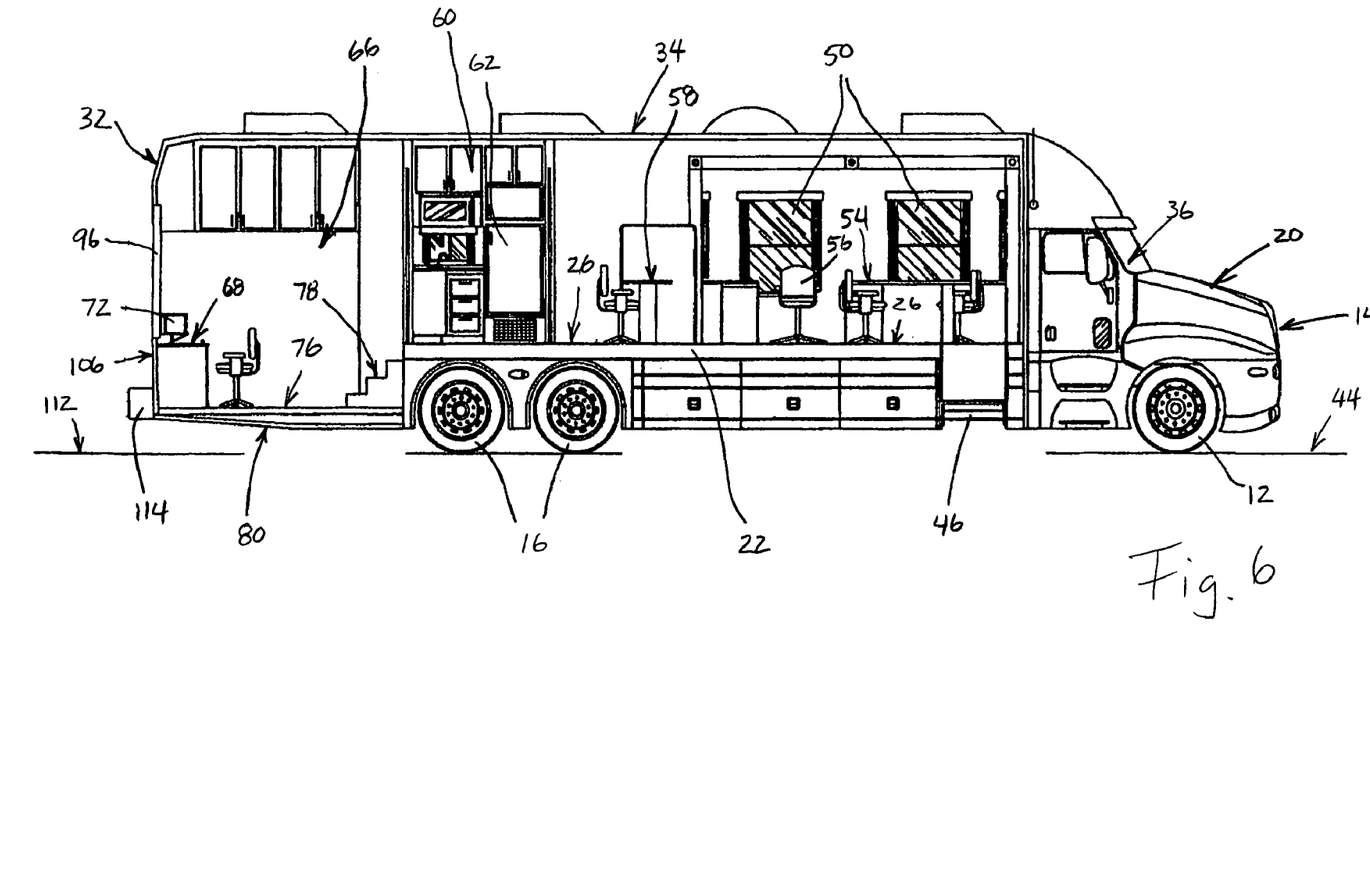
FIG. 6 is a side elevation view of the mobile banking vehicle shown in FIG. 4 with the side wall removed and showing the interior layout.
Figure 7:
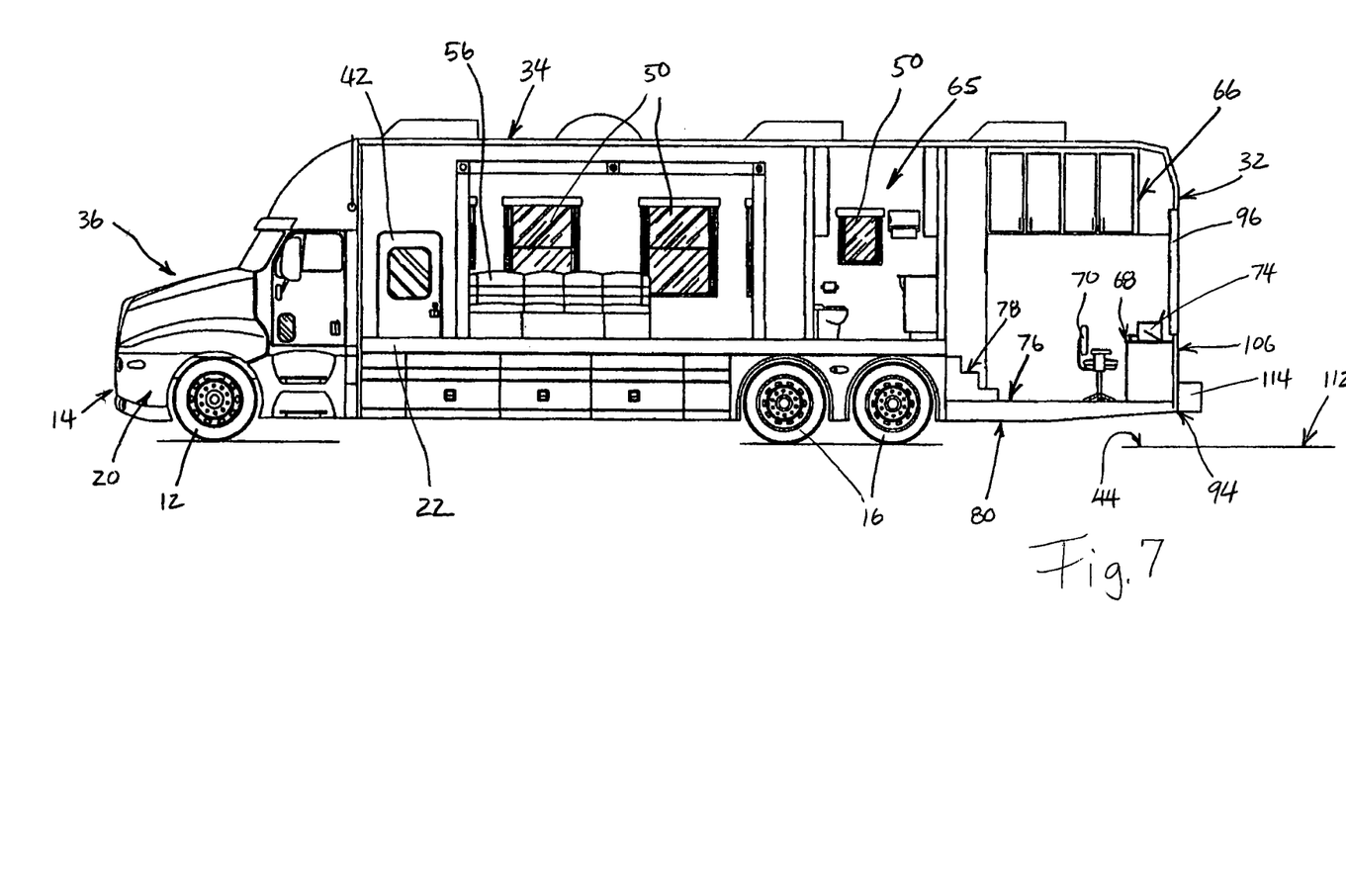
FIG. 7 is an elevation of the mobile banking vehicle shown in FIG. 4 with the side wall removed and showing the interior layout view opposite that shown in FIG. 6.
Figure 8:
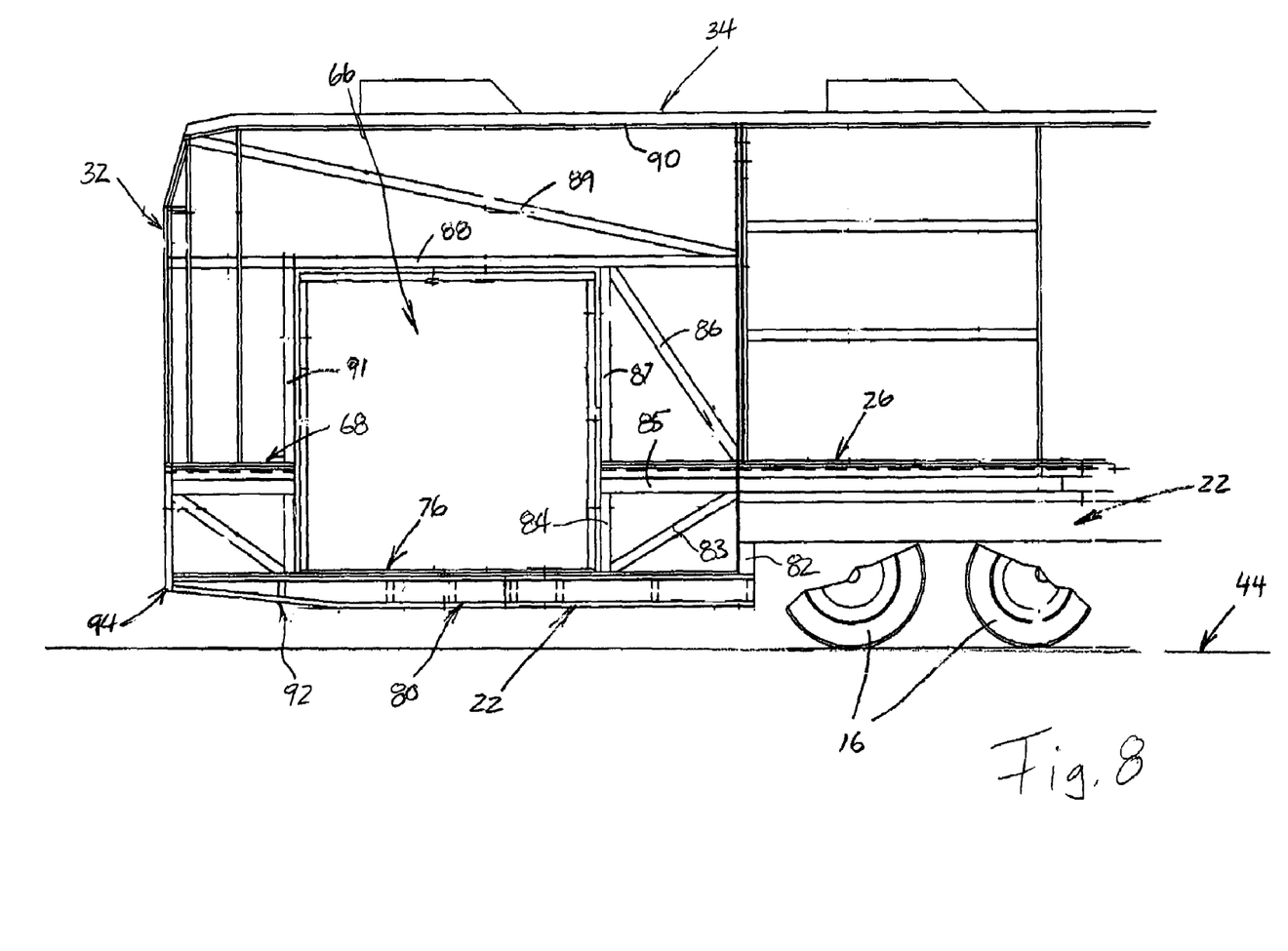
FIG. 8 is a partial side elevation view of the mobile banking vehicle shown in FIGS. 1-3 with the side wall exterior surface removed and showing the chassis and framing thereof; and, FIG. 9 is a side elevation diagrammatic view of a mobile banking vehicle in accordance with the principles of the present invention and depicting the chassis and lowered teller floor area.
Figure 9:
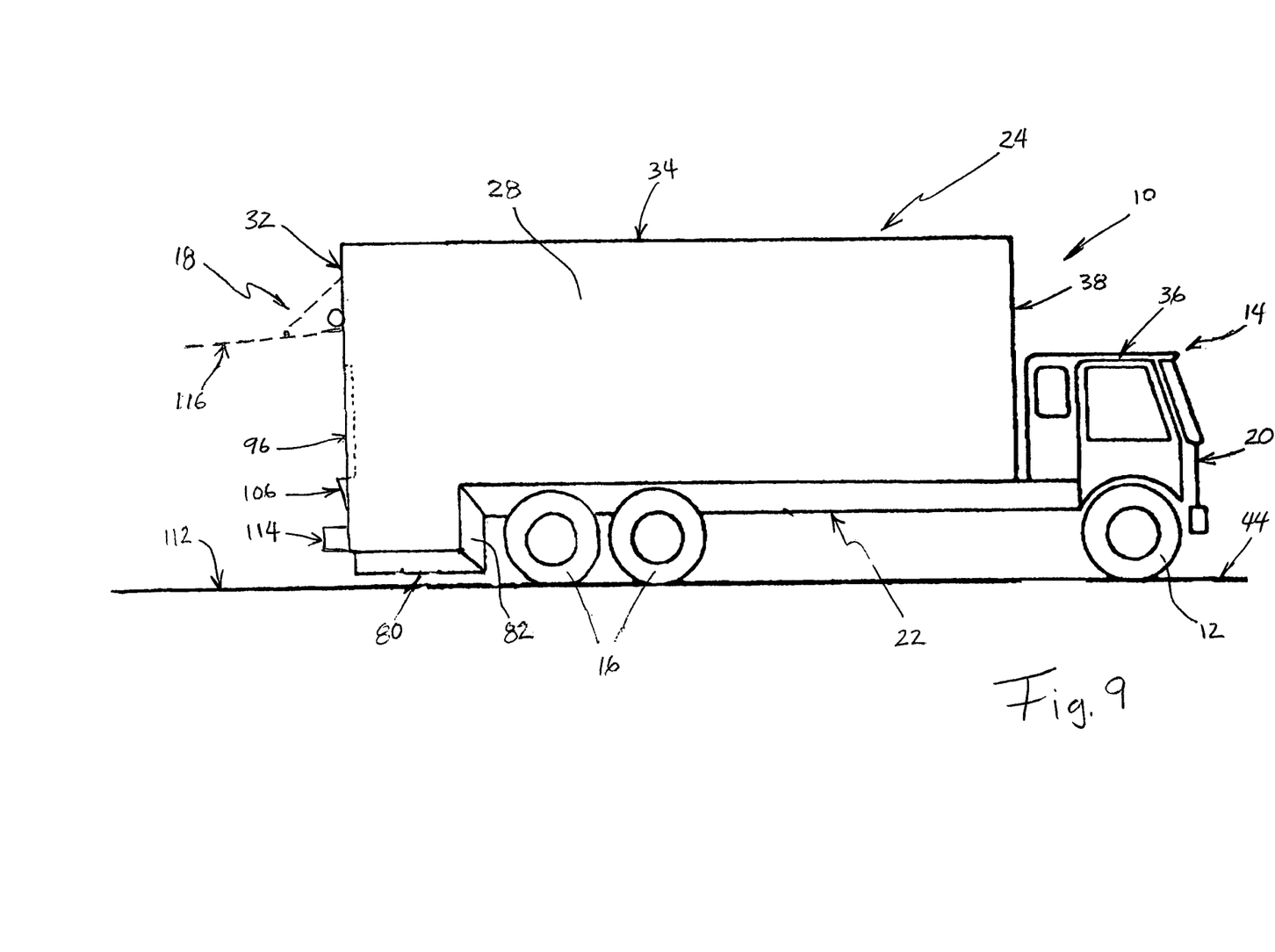

Mobile banking vehicle 10 includes a chassis 22, diagrammatically shown in FIGS. 7-9, which is supported by the front wheels 12 and rear wheels 16 with a suspension system (not shown) in a known and customary manner. Chassis 22 supports the office area enclosure 24 which is generally formed of a floor 26 (FIGS. 4-8), right side wall 28 (FIG. 1), left side wall 30 (FIG. 2), rear wall 32 (FIG. 3) and roof 34 (FIG. 3). Because the floor 26 is supported by the wheels, axles, suspension and chassis, it is typically at a height of about 25-61 inches from a ground surface 44, depending on the size of such components. A driving cab area 36 is provided at the front end 14 of vehicle 10 and can be separate from the office area enclosure 24 as shown in FIGS. 5 and 9 or, preferably, formed together with and for access from the office area enclosure as shown in FIG. 4. When the cab area 36 is separate from the enclosure 24, a front wall 38 forms the front of enclosure 24, whereas when cab area 36 is formed together with the enclosure 24 the cab functions as the front wall of the enclosure 24. In the embodiment of FIG. 4, a cab door 40 is provided through the front wall 38 between the cab area 36 and the office area enclosure 24.

An exterior entrance door 42 is provided through side wall 28 leading to within the office area enclosure 24. Because the height of floor 26 is set on chassis 22 and is higher than the ground surface 44, steps 46 are provided near the door 42 between the ground surface 44 and the floor 26. One or more of the steps can be retractable and are used by extending for use and retracting when vehicle 10 is in transport. Extending sections 48 can be provided for selectively extending the side walls 28, 30 outwardly and increasing the size of the office area enclosure 24 as best shown if FIGS. 4 and 5. Windows 50 are also provided in side walls 28, 30 for providing yet more comfort to bank personnel and customers within the office enclosure 24.

The interior of the office area enclosure 24 can be configured in different ways and two preferred configurations are shown in FIGS. 4 and 5. In FIG. 4, the office area generally includes a lobby area 52 with a reception desk 54 and seating 56; interior teller desks 58; kitchenette 60 with refrigerator 62 and sink 64; bathroom 65; and, lowered drive-up teller area 66 with teller counter 68, chairs 70, computer 72, printer 74 and other amenities as are normally needed for drive-up banking transactions. The office shown in FIG. 5 generally similarly includes a lobby area 52 with a reception desk 54, seating 56 and check stand 55; interior teller desk 58; kitchenette 60 with refrigerator 62 and sink 64; bathroom 65; and, lowered drive-up teller area 66 with teller counter 68, chair 70, computer 72, printer 74 and other amenities as are normally needed for drive-up banking transactions.

The chassis 22 of vehicle 10 has been modified so that the drive-up teller area floor 76 is lower than the rest of the office area enclosure floor 26, and interior steps 78 are provided between the lower teller area floor 76 and the lobby and other areas higher floor 26. More particularly, as best shown in FIGS. 8 and 9, the drive-up teller area 66 or portion of chassis 22 behind rear wheels 16 is dropped relative to the rest of the chassis and is formed with a plurality of beams 80 which are attached to the rest of the chassis 22 via reinforcing members 82, 83, 84 and 85. A truss structure is also formed within the side walls 28, 30 with truss members including members 86-91 as shown in FIG. 8 serving to rigidify and support the drive-up teller area 66.

Preferably, by lowering the drive-up teller area floor 76 in this manner, the minimum ground clearance or height of the bottom of beams 80 near rear wheels 16 is about 12 inches from the ground surface 44. Beams 80 are slopped upwardly at the terminal portion 92 so that the rear terminal end 94 minimum ground clearance or height is about 17 inches from the ground surface 44. Additionally, the drive-up teller area floor 76 is preferably about 17-21 inches above the ground surface 44, and the top surface of the teller counter 68 is preferably about 35-61 inches above the ground surface.

A teller window 96 is provided at the lowered drive-up teller area 66 preferably through the exterior rear wall 32, although it is contemplated it could also be placed in the side walls 28, 30 at the lowered drive-up teller area 66. Teller window 96 includes bullet resistant glass 98 and, in light of the lowered drive-up floor 76, its bottom edge 100 is about 35-57 inches, and more preferably about 37-41 inches, above the ground surface 44. Accordingly, window 96 is at a comfortable and proper height for banking personnel or teller working at teller counter 68, and is also at a comfortable and proper height on the outside of the office enclosure 24 and relative to the ground surface 44 for drive-up banking.

The mobile banking vehicle 10 further includes an intercommunication system whereby verbal communication is selectively provided between the teller inside the enclosure 24 and the outside of the enclosure adjacent the teller window 96. The intercommunication system may be in the form of an opening through the window glass 98 and a steel insert 102 secured in the glass opening and having a plurality of slots wherethrough communication is provided between the inside and the outside of the enclosure 24. More preferably, the intercommunication system is in the form of electronic intercom 104 including electronic microphones and speakers.

A transaction drawer 106 is provide preferably through the rear wall 32 below the teller window 96, so that financial documents can be selectively moved between the inside and the outside of the enclosure 24. As best seen in FIGS. 4 and 5, transaction drawer 106 is built into the teller counter 68 so that the opening into the drawer is flush with the counter 68 top or working surface. Preferably, the transaction drawer 106 includes a bottom drawer surface 108 located within about 25-52 inches, and more preferably about 25-29 inches, from a ground surface 44 for thereby placing the transaction drawer 106 at a comfortable and proper height for use by the customer outside and the teller inside the enclosure 24. As used herein, "transaction drawer" is intended to include an opening below the lowermost edge 100 of the teller window glass 98 wherethrough financial documents can be passed, or the preferred sliding drawer 106 shown in FIGS. 3-5 which includes a drawer door 110 which is coupled to and adapted to open and close with the drawer for providing access to the drawer by only one of the bank teller or customer at any time, or transaction drawers similar thereto for use in passing documents and things between the inside and outside of enclosure 24.

Because the teller window 98 and transaction drawer 106 are at a comfortable and proper height for drive-up banking, a customer vehicle drive-up ground surface lane or area 112 can and is provided outside of the enclosure 24 adjacent the rear wall 32, teller window 98 and transaction drawer 106. The drive-up area is at the ground surface 44 level and allows a banking customer to drive his vehicle next to the rear wall 32 for conducting his banking business. In this regard, the mobile banking vehicle 10 further includes a bumper 114 extending out from the rear wall 32 and below the teller window 98. The bumper 114 extends at least eight inches, and preferably 10-12 inches, away from the rear wall 32 and serves to help banking drive-up customers locate their vehicle at a proper distance from the rear wall 32 as they approach the drive-up area 112. It is noted that transaction drawer 106 is sized accordingly so that it may selectively be extended out from the rear wall 32, as shown in FIG. 3, a sufficient distance relative to the bumper 114 so that a banking customer may comfortably reach inside the drawer while in his vehicle and on the drive-up area 112. In an alternate embodiment, the bumper 114 is selectively extendable and retractable such as with a hydraulic system so that, while the banking vehicle is in use, the bumper is extended to about 12 inches away from rear wall 32, and while in transport it is retracted to about 6 inches away from the rear wall 32.

For yet additional comfort and utility, the banking vehicle 10 is provided with a canopy 116, shown in dash lines in FIG. 9, which is selectively extendable from the rear wall 32 substantially over the drive-up area 112 and the teller window 96 and transaction drawer 106. Accordingly, in the event of rain, a banking customer in his vehicle and on the drive-up area 112 can pass financial documents in and out of transaction drawer 106 without such documents getting wet.

An ATM interface 118 is also provided in sidewall 28 and is located at a height comfortably usable and proper for both drive-up and walk-up use by banking customers.

While the invention has been described as having specific embodiments, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A mobile banking vehicle comprising:
    an enclosure having a floor, walls and roof, a door in a wall providing access of personnel to within said enclosure, and wheels supporting and for transport of the enclosure;
    said enclosure including a first area having a first floor height whereupon said personnel are supported;
    said enclosure including a second area having a second floor height whereupon said personnel are supported, said second floor height being lower than said first floor height; and,
    a teller window through a wall of said enclosure adjacent said second area providing visibility between said personnel inside said enclosure and customers outside said enclosure.

2. The mobile banking vehicle of claim 1, further comprising a transaction drawer through said wall adjacent said teller window, whereby financial documents may be selectively moved between the inside and the outside of the enclosure.

3. The mobile banking vehicle of claim 2, further comprising an intercommunication system whereby verbal communication is selectively provided between the inside and outside of the enclosure adjacent said teller window.

4. The mobile banking vehicle of claim 3, further comprising a bumper extending from said wall substantially below said teller window.

5. The mobile banking vehicle of claim 4, further comprising a canopy selectively extendable from said wall substantially over said teller window and transaction drawer.

6. The mobile banking vehicle of claim 5, further comprising a customer vehicle drive-up area outside of the enclosure adjacent said teller window.

7. The mobile banking vehicle of claim 4, wherein said bumper extends at least eight inches away from said wall.

8. The mobile banking vehicle of claim 4, wherein said bumper is selectively extendable and retractable.

9. The mobile banking vehicle of claim 2, wherein said transaction drawer includes a bottom drawer surface located within 52 inches from a ground surface.

10. The mobile banking vehicle of claim 1, wherein said mobile banking vehicle includes an engine for selectively engaging and driving said wheels.

11. The mobile banking vehicle of claim 1, further comprising an intercommunication system whereby verbal communication is selectively provided between the inside and outside of the enclosure adjacent said teller window.

12. The mobile banking vehicle of claim 1, further comprising a bumper extending from said wall substantially below said teller window.

13. The mobile banking vehicle of claim 1, further comprising a customer vehicle drive up area outside of the enclosure adjacent said teller window.

14. The mobile banking vehicle of claim 13, further comprising a transaction drawer through said wall adjacent said teller window, whereby financial documents may be selectively moved between the inside and the outside of the enclosure.

15. The mobile banking vehicle of claim 13, further comprising a bumper extending from said wall substantially below said teller window.

16. The mobile banking vehicle of claim 13, further comprising a canopy selectively extendable from said wall substantially over said teller window and transaction drawer.

17. A mobile banking vehicle comprising:
    an enclosure having a floor, walls and roof, a door in a wall providing access of personnel to within said enclosure, and wheels supporting and for transport of the enclosure; and,
    a transaction drawer extending through a wall for selectively moving financial documents between said personnel inside the enclosure and customers outside of the enclosure.

18. The mobile banking vehicle of claim 17, further comprising:
    a first area having a first floor height;
    a second area having a second floor height lower than said first floor height; and,
    wherein said transaction drawer is located adjacent said second area.

19. The mobile banking vehicle of claim 17, wherein said transaction drawer includes a bottom drawer surface located within 52 inches from a ground surface.

20. The mobile banking vehicle of claim 17, further comprising an intercommunication system whereby verbal communication is selectively provided between the inside and outside of the enclosure adjacent said teller window.

21. The mobile banking vehicle of claim 17, further comprising a bumper extending from said wall substantially below said teller window.

22. The mobile banking vehicle of claim 17, further comprising a customer vehicle drive up area outside of the enclosure adjacent said teller window.

23. The mobile banking vehicle of claim 22, further comprising a transaction drawer through said wall adjacent said teller window, whereby financial documents may be selectively moved between the inside and the outside of the enclosure.

24. The mobile banking vehicle of claim 22, further comprising a bumper extending from said wall substantially below said teller window.

25. The mobile banking vehicle of claim 22, further comprising a canopy selectively extendable from said wall substantially over said teller window and transaction drawer.

26. A mobile banking vehicle comprising:
    a vehicle chassis having a front terminal end and rear terminal end;
    front wheels supporting the chassis adjacent said front terminal end at a vertical height and adapted for steering the banking vehicle;
    rear wheels supporting the chassis adjacent said rear terminal end at said vertical height;
    an engine carried by said chassis for selectively engaging and driving one of said front or rear wheels;
    wherein a rear portion of said chassis between said rear wheels and said rear terminal end is located lower than said chassis vertical height;
    a personnel carrying floor supported by said chassis rear portion;
    a wall adjacent said lower rear portion; and,
    a teller window through said wall providing visibility between said personnel within said vehicle and customers outside of said vehicle.

27. The mobile banking vehicle of claim 26, further comprising a transaction drawer is located adjacent said wall, whereby financial documents may be selectively moved between the inside and the outside of the enclosure.

28. The mobile banking vehicle of claim 27, wherein said transaction drawer includes a bottom drawer surface located within 52 inches from a ground surface.

29. The mobile banking vehicle of claim 26, wherein said teller window includes a bottom edge located within 57 inches from a ground surface.

30. The mobile banking vehicle of claim 26, further comprising an intercommunication system whereby verbal communication is selectively provided between the inside and outside of the enclosure adjacent said teller window.

31. The mobile banking vehicle of claim 26, further comprising a bumper extending from said wall substantially below said teller window.

32. The mobile banking vehicle of claim 26, further comprising a customer vehicle drive up area outside of the enclosure adjacent said teller window.

33. The mobile banking vehicle of claim 32, further comprising a transaction drawer through said wall adjacent said teller window, whereby financial documents may be selectively moved between the inside and the outside of the enclosure.

34. The mobile banking vehicle of claim 26, further comprising a bumper extending from said wall substantially below said teller window.

35. The mobile banking vehicle of claim 26, further comprising a canopy selectively extendable from said wall substantially over said teller window and transaction drawer.

* * * * *